(12) United States Patent
Veres et al.

(10) Patent No.: US 6,609,186 B1
(45) Date of Patent: Aug. 19, 2003

(54) METHOD AND SYSTEM FOR MANAGING DATA IN COMPUTER MEMORY

(75) Inventors: James E. Veres, Woodinville, WA (US); Luis Huapaya, Bellevue, WA (US); Scott R. Leatham, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/491,156

(22) Filed: Jan. 26, 2000

Related U.S. Application Data

(60) Provisional application No. 60/127,971, filed on Apr. 6, 1999.

(51) Int. Cl.[7] .............................................. G06F 12/02
(52) U.S. Cl. ........................ 711/171; 707/206; 709/316
(58) Field of Search ................................ 707/101, 103, 707/205, 206; 709/316, 332; 711/133, 134, 136, 159, 160, 171

(56) References Cited

U.S. PATENT DOCUMENTS

| 5,189,733 A | * | 2/1993 | Bennett et al. ............. | 711/170 |
| 5,568,635 A | * | 10/1996 | Yamaguchi ................. | 711/171 |
| 5,857,203 A | * | 1/1999 | Kauffman et al. .......... | 707/200 |
| 6,009,520 A | * | 12/1999 | Gharda ......................... | 713/1 |
| 6,125,400 A | * | 9/2000 | Cohen et al. ................ | 709/247 |
| 6,134,602 A | * | 10/2000 | Engstrom et al. ........... | 709/328 |
| 6,157,948 A | * | 12/2000 | Inoue et al. ................. | 709/219 |
| 6,266,742 B1 | * | 7/2001 | Challenger et al. ......... | 711/133 |

FOREIGN PATENT DOCUMENTS

| EP | 0901073 | 3/1999 |
| JP | 08234992 | 9/1996 |

OTHER PUBLICATIONS

Miastkowski, Stan, "Weeding Windows", BYTE, U.S. McGrqw–Hill Inc., St. Peterborough, N.H., vol. 20, No. 7, Jul. 1, 1995 pp. 133–134; 136; 138.

Anonymous, "Fast Seek Technique" IBM Technical Disclosure Bulletin, vol. 32, No. 9A, Feb. 1990, New York, USA, pp. 144–151.

* cited by examiner

*Primary Examiner*—Gary Portka
(74) *Attorney, Agent, or Firm*—Woodcock Washburn LLP

(57) ABSTRACT

A system for managing space in a computer memory is disclosed. The system creates free space in a computer memory by using a "downsize" operation, which selectively removes data from a data object residing in the memory. Each data object in the memory provides a downsize operation designed for that data object, which reduces the amount of space that the data object occupies in the memory by deleting data that can be recreated from another source, or data that is not essential to the function of the data object. Each data object may also provide a "restore" operation, which returns the object to a usable state in the memory by replacing data in the memory that has been removed by a prior downsize operation. The restore operation is used if an attempt is made to access the data object after it has been downsized. The system can be used to manage various types of memory containing various types of data objects. One use of the system is to manage the space on a personal computer hard disk by downsizing applications on the disk when additional disk space is needed and then restoring a downsized application when a user attempts to run it. Another use of the system could include management of a database on a storage medium by deleting portions of the database that have been archived on another medium and retrieving portions from the archive on an as-needed basis.

34 Claims, 7 Drawing Sheets

METHOD AND SYSTEM FOR MANAGING DATA IN COMPUTER MEMORY

CROSS-REFERENCE TO RELATED APPLICATIONS

This application claims the benefit of U.S. Provisional Application No. 60/127,971, filed Apr. 6, 1999 and entitled "Game Installation Management."

TECHNICAL FIELD

This invention relates generally to the field of computer systems, and, more particularly, to the management of data residing in computer memory devices.

BACKGROUND OF THE INVENTION

It is often the case that data objects occupy space in a computer memory, even when there is no immediate need for a computer system to retrieve them from the memory. These data object take up space that could otherwise be used by new data. It is desirable for the computer system employing the memory to remove from the memory data that is not presently being used, in order to make room for new data.

A hard disk on a personal computer is an example of a memory that may become filled with data objects, such as application programs or databases. Game applications, in particular, are exemplary of the type of data objects that present the problem addressed herein, because their usage pattern is often characterized by an initial period of frequent use (i.e., when the user has just purchased the game and is interested in playing it), followed by a period of infrequent use or non-use (when the user has won the game or lost interest in the game). These game applications tend to accumulate and can lead to large amounts of disk space being consumed by applications that may never be used again. To maintain on a hard disk a data object that the user will never use is wasteful of space, and, assuming that it can be determined that the data object will not be used again, the data object may be removed entirely from the hard disk.

When a computer system attempts to place new data in a memory such as a hard disk (e.g., where a user installs a new application on the disk) and there is not sufficient space for the new data, either data must be removed from the disk to make room for the new data, or additional memory must be added, or both. In order to create space on the disk, the user may examine the contents of the disk and selectively remove data for which there is no foreseeable need (e.g., by uninstalling applications, by deleting files, etc.). This method, however, places a burden on the user, as the user must interrupt what he is doing and manually select data to be removed. Moreover, the user may predict incorrectly which data objects will not be used in the future. If a removed data object is needed in the future, the user must reinstall it from a secondary source, such as a CD-ROM or a network server; if there is no secondary source containing the data, then the removed data cannot be replaced. Additionally, there may be data objects for which some of the data comprising the object can be recreated from a secondary source, but some data cannot be recreated. It is burdensome, and sometimes not possible, to select recreateable portions of a data object for removal (e.g., bitmap images for use with a game application), while preserving non-recreateable data (e.g., user high score, or saved game files).

In view of the foregoing, there is a need for a system that overcomes the limitations and drawbacks of the prior art.

SUMMARY OF THE INVENTION

The invention manages space in a computer memory by removing data from the memory in a manner that does not preclude use of the data object that comprises the data. The invention contemplates the use of a "downsize" operation, which reduces the space occupied by a data object in a memory in order to free up space for new data. A data object is a collection of associated data organized into separable parts. Example data objects include application programs (where the parts may include: executable files, video files, bitmap images, etc.), and databases (where the parts may include: files of data, some of which have been archived elsewhere; a directory for the data; etc.). Each data object provides a downsize operation, which is designed with respect to the specific data that the object comprises, the importance of the data for the object's function, and whether the data can be recovered from another source if necessary. The downsize operation for a given data object may reduce the size of the data object by removing non-essential data. The downsize operation may also reduce the size of the object by removing data that can be recreated from another source if necessary. A system in accordance with the invention selects a data object to downsize and calls the object's downsize operation when the system needs to create space.

An example data object may be a software application residing on a hard disk. If a user needs additional space on the disk (e.g., to install a new application), the system could select an application that has not been used for a long period of time and call the application's downsize operation to create more space. An example downsize operation provided with the application could remove non-essential data, such as the data file for an introductory video tour of the software, which the user has already seen. The downsize operation could also remove data that can easily be recovered from the application's CD-ROM, such as executable files or bitmap images used by the software. In designating recoverable data to delete, the downsize operation may be designed to consider the ease with which the data can be recovered. For example, the downsize operation may remove data that can be reloaded quickly from a CD-ROM, but not data that must be recovered from a server by way of a slow dial-up connection. The downsize operation may also leave on the hard disk data associated with the data object that cannot be recreated from another source. In the example, such data might include user-created files, a file of system-dependent parameters, or a file of user preferences that were provided by the user at the time the application was installed. The downsize operation may remove different amounts of data based on input from the system specifying how much memory the system needs (e.g., the downsize operation first deletes information that can be recovered quickly from a CD-ROM, but will also delete information that must be recovered from a slow dial-up connection if necessary to satisfy the system's space request). Each application provides a downsize operation appropriate for the type of data associated with the application.

The invention also contemplates a "restore" operation, which may be provided with the data object to work together with the downsize operation. The restore operation replaces data that has been removed by a prior downsize operation. While a data object may provide a downsize operation without a restore operation, providing a restore operation allows the data object to provide a more effective downsize operation, which removes essential data that can be recreated from another source (e.g., executable files residing on a CD-ROM, database files that have been archived to a tape, etc.), rather than merely non-essential data (e.g., an introductory video tour of an application, etc.). If a user later attempts to access a downsized data object, the system calls the data object's restore operation, which reloads data from a secondary source (e.g., a CD-ROM).

Game software installed on a hard disk exemplifies a use of the system. Games typically obey a usage pattern characterized by a period of intense use when the game is new, followed by infrequent use or non-use after the user has won the game or lost interest in the game. Much of the data associated with a game application (e.g., executable files, bitmap images, etc.) is typically copied to a computer system's hard disk from a CD-ROM at the time the game is installed, and can be copied to the hard disk again if it is needed subsequent to being removed. If a user needs more space on the disk, a system embodying the invention could select, for example, the least recently played game application and call the game's downsize operation. The downsize operation could delete all executable files and bitmap images that had been copied to the hard disk from a CD-ROM at install time, leaving on the disk a file containing the user's high scores for the game. If the user subsequently reacquires an interest in the game and attempts to run it, the system calls the restore operation to replace the removed data to the disk (e.g., from a CD-ROM, prompting the user to insert the CD-ROM, if necessary). If there is not enough space on the disk to reinstall the data, the system selects another game application to downsize and calls that application's downsize operation prior to restoring the data to the disk.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Much software is purchased to fill a short-term need, for example, a seasonal tax-preparation software package, or a game application that the user plays for only a few weeks or months. Long after these applications have served their purpose to the user, they continue to occupy space on a computer's hard disk. An application manager in accordance with the invention can be used to free up space occupied by such an application, while allowing the application to be restored to a usable state if the user should decide to run the application again in the future.

Computer Environment

Figure 1:
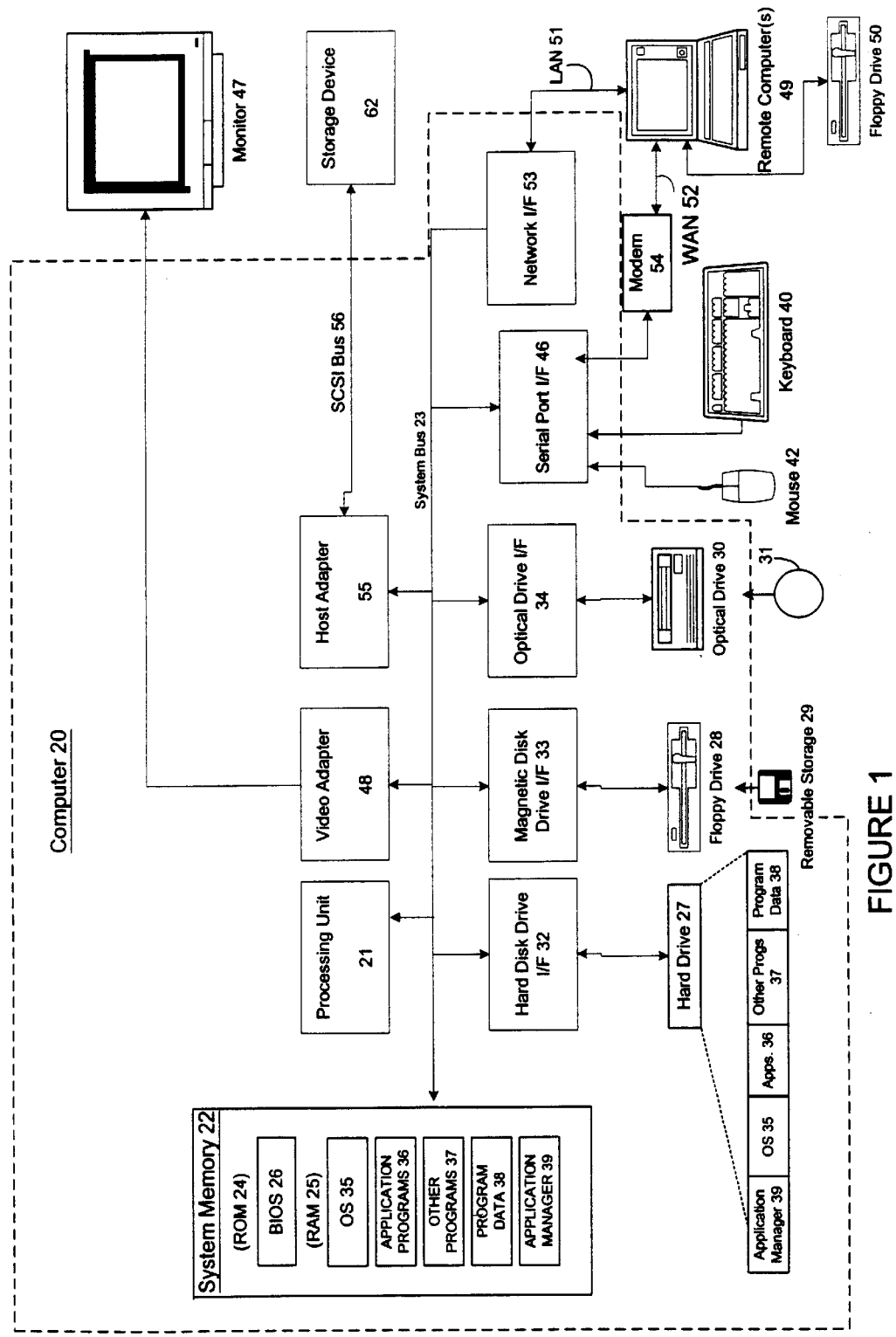
FIG. 1 is a block diagram representing a computer system in which aspects of the invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37, program data 38, and an application manager 39. A user may enter commands and information into the personal computer 20 through input devices such as a keyboard 40 or a pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port, universal serial bus (USB), or a 1394 high-speed serial port. A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Memory Management

Figure 2:
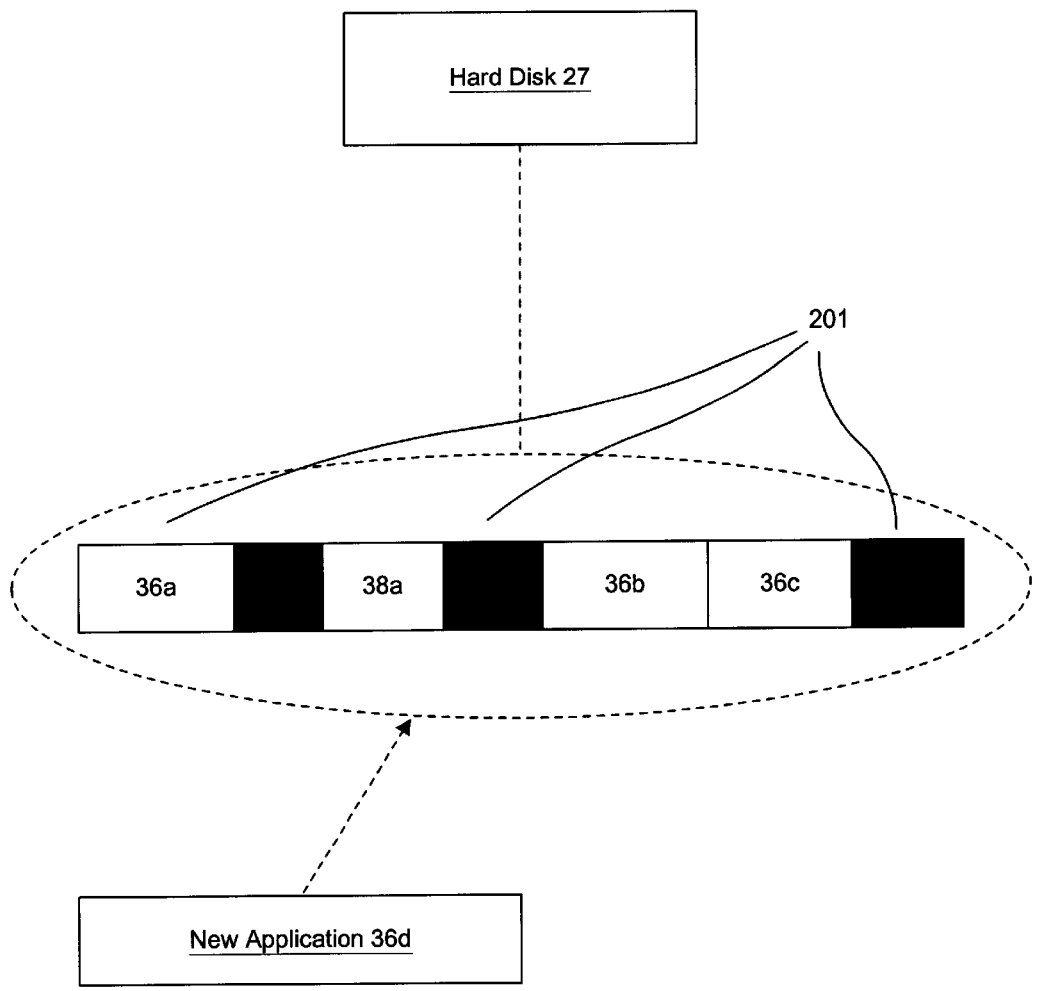
FIG. 2 is a diagram of a computer memory device with which aspects of the invention may be used.

FIG. 2 shows an exemplary computer memory, hard disk 27, which contains various data objects for use with computer 20. Data objects residing on hard disk 27 include application programs 36a, 36b, and 36c, and program data 38a. Hard drive 27 also has empty space 201, which may be a contiguous space, or may be scattered in between data objects, as shown in FIG. 2. A user may want to install a new data object on hard disk 27, such as application program 36d. New application program 36d is too large to fit in empty space 201 on hard disk 27. An application manager in accordance with the invention can be used find additional space on hard disk 27 in which application program 36d may be installed. The application manager finds additional space by calling for data objects on hard disk 27 to be downsized, such as applications 36a, 36b, and 36c.

Figure 3:
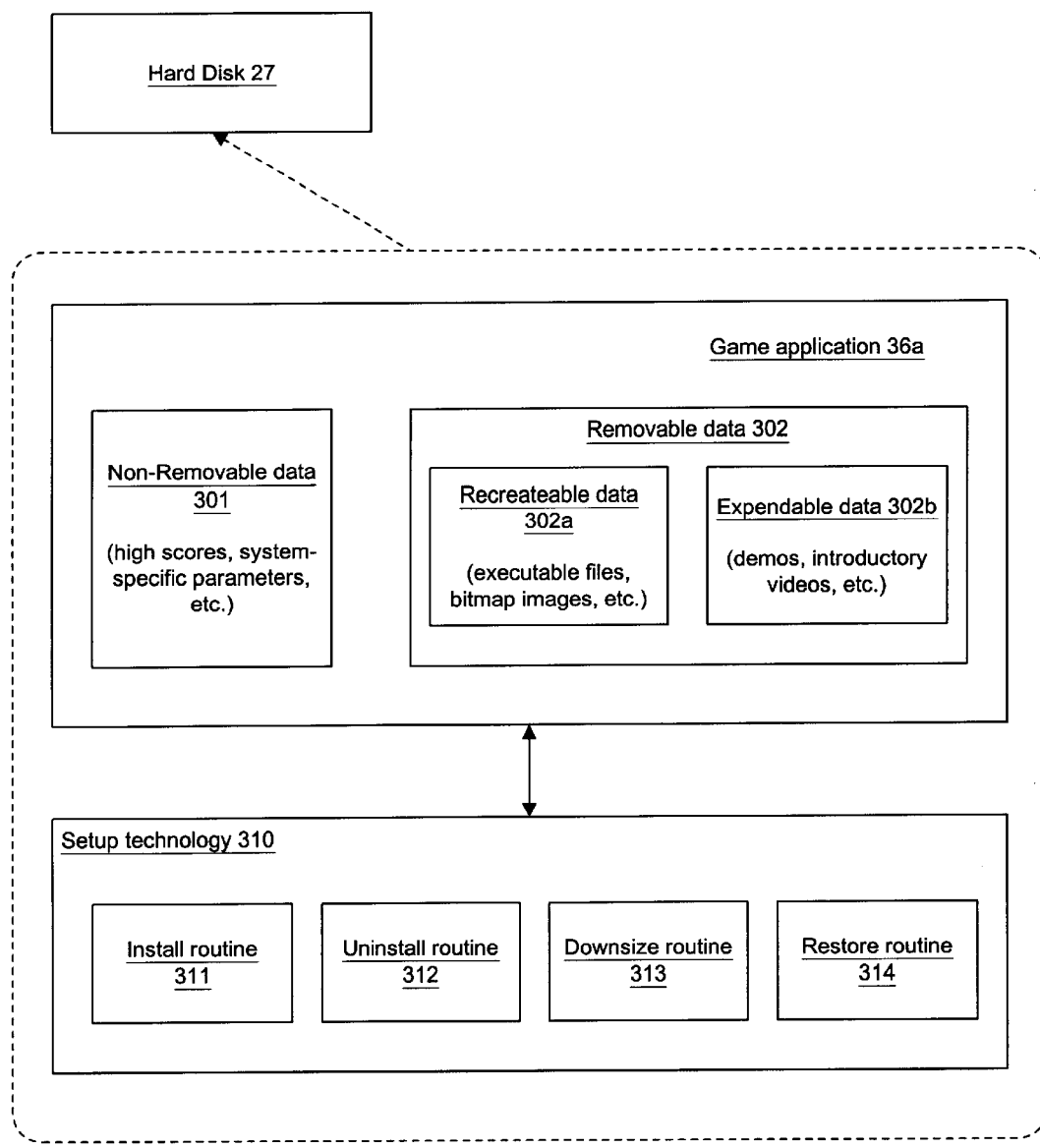
FIG. 3 is a block diagram showing the detail of a data object for use with an application manager in accordance with aspects of the invention.

FIG. 3 shows the detail of game application 36a, which is a typical data object residing in a computer memory such as hard disk 27. Game application 36a contains non-removable data 301. In the case of a game application, non-removable data 301 could include a record of the user's high scores, hardware-specific parameters such as the type of graphics card installed on the system, user preferences that were configured by the user at the time that game application 36a was installed, or other types of data that cannot easily be recreated from a source such as a CD-ROM. For another type of data object, such as a database, non-removable data might include the database directory and data files that have not been archived. Game application 36a also contains removable data 302. Removable data 302 includes recreatable data 302a and expendable data 302b. Recreateable data 302a may include executable files, fixed program data such as bitmaps, or other data that can easily be retrieved or reconstructed from a source, such as a CD-ROM. In the example where the data object is a database, recreateable data could include archived data files that can be retrieved from a tape. Expendable data 302b includes data which is not necessary for the normal operation of application program 36a. In the case where the data object is a game application, examples of such data might include a game demo that the user has already played, or an introductory video that the user has already seen.

Game application 36a is also associated with setup technology 310. A setup technology is particular to the data object with which it is associated. In FIG. 3, setup technology 310 is the setup technology for game application 36a. Setup technology 310 includes an install routine 311, and uninstall routine 312, a downsize routine 313, and a restore routine 314. An install routine 311 contains computer-executable instructions to install a data object, such as game application 36a, in a memory device, such as hard disk 27. An uninstall routine 312 contains instructions to remove a data object, such as game application 36a, from the device on which it has been installed. A downsize routine 313 contains instructions to remove some data associated with a data object from the device to which it has been installed. For example, downsize routine 313 may remove recreateable data 302a and expendable data 302b from the device to which game application 36a has been installed. A restore routine replaces in a memory device some or all of the data removed from a data object by the data object's associated downsize routine, e.g., restore routine 314 replaces on hard disk 27 data that was removed from game application 36a by downsize routine 313. Setup technology 310 may reside on the same memory device as game application 36a, as shown in FIG. 3, or it may reside in another location accessible to computer 20, such as on another disk drive (not shown), or on remote computer 49. Each data object provides its own setup technology, which provides the particular steps necessary to install, uninstall, downsize, and restore the data object. Ideally, the setup technology has been designed to take advantage of the particular nature of the data comprising the data object with which it is associated; for example, the downsize routine 313 contained in setup technology 310 may remove executable files from hard disk 27, and restore routine 314 may replace those files to hard disk 27 from a CD-ROM. As an alternative example, a setup technology associated with a database could include a downsize routine that keeps track of which files have been archived and removes only archived files.

Figure 4:
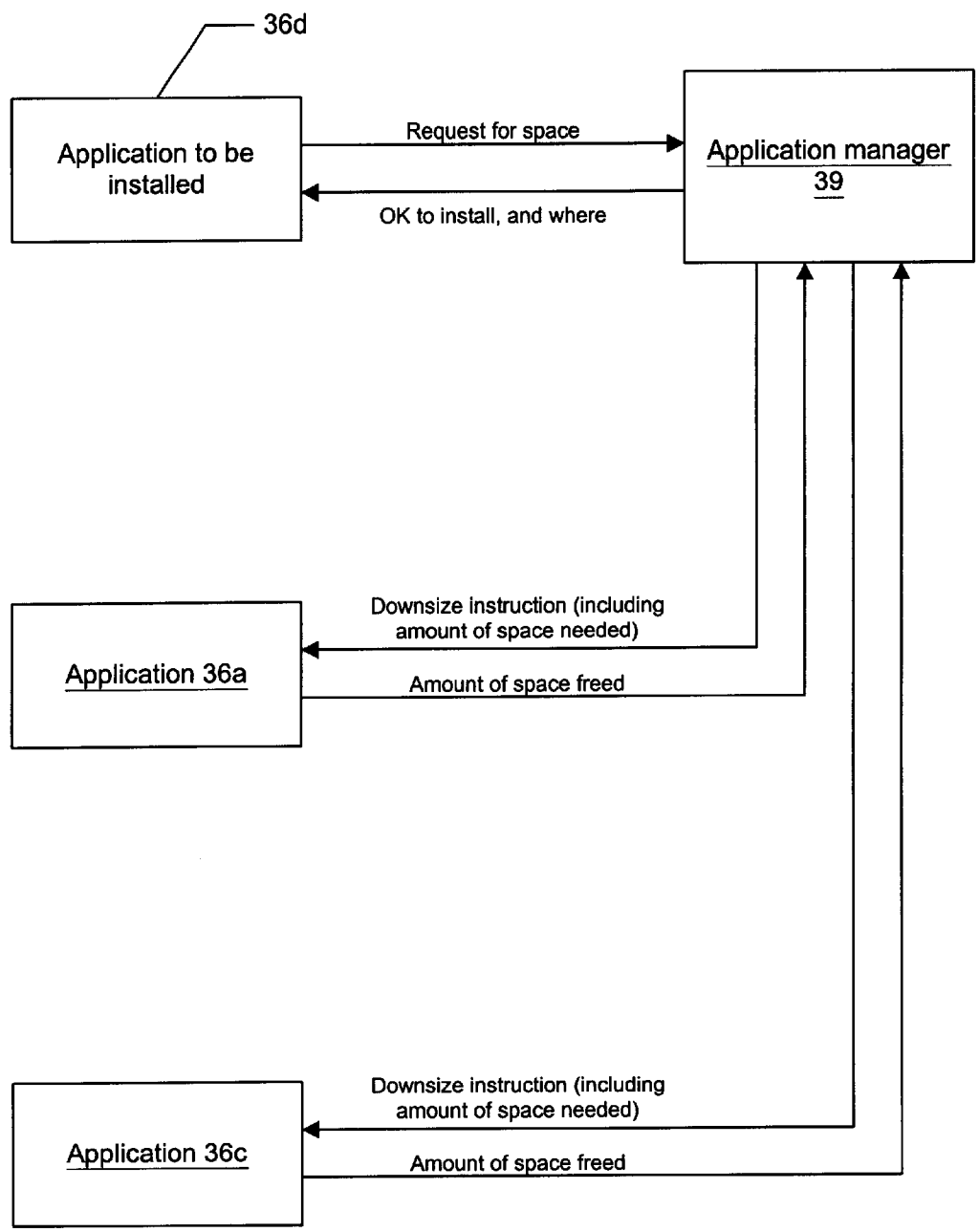
FIG. 4 is a block diagram showing the use of downsize operations by an application manager, in accordance with aspects of the invention.

FIG. 4 shows an exemplary use of a system embodying the invention. The example system, application manager 39, manages storage space occupied by application programs by downsizing existing applications when a user attempts to write new data, such as application program 36d, to a storage medium, such as hard disk 27, on which insufficient free space exists. The invention could also be embodied in a system that manages other types of data on other types of storage media; for example, a database manager could downsize a database (e.g., by deleting archived data files) when an attempt is made to write new data to the primary storage medium and there is insufficient space for the new data.

In the example depicted in FIG. 4, a user begins the process of installing application program 36d by running the install routine for application program 36*d*. The install routine requests from application manager 39 space to install application program 36*d* and notifies application manager 39 of the amount of space needed. Application manager 39 may be integrated into operating system 35, in which case the install routine requests space from the operation system, which uses application manager 39 to obtain the space. Alternatively, application manager 39 may be a stand-alone software module that operates outside of operating system 35, in which case the install routine for application 36*d* requests the space directly from application manager 39. FIG. 4 depicts an implementation in which space is requested directly from application manager 39.

In order to create space to install application program 36*d*, application manager 39 first selects an application to downsize, such as application program 36*a*, and attempts to downsize the selected application. Possible criteria upon which application program 36*a* is selected for downsizing are discussed below in the text accompanying FIG. 5. The downsizing is performed by calling the downsize routine associated with application 36*a*. Preferably, application manager 39 informs the downsize routine associated with application 36*a* of the amount of space that it is looking for in order to satisfy the installation space requirements of application program 36*d*, and the downsize routine can free up large or small amounts of space depending upon what is needed. The downsize routine for application program 36*a* frees up space, and notifies application manager 39 of the amount of space freed. Application manager 39 determines whether this space is sufficient to install application program 36*d*. If there is sufficient space, application manager 39 notifies the install routine of application program 36*d* that there is sufficient space to install application program 36*d* and of the location of the space. If there is not sufficient space to install application program 36*d*, then application manager 39 issues another downsize instruction by calling the downsize routine associated with a different application program. For example, in FIG. 4, application manager 39 next calls the downsize routine for application program 36*b*, which then notifies application manager 39 of the amount of space freed up. This process is repeated, preferably by calling downsize routines for different applications, until sufficient space has been freed. Application manager 39 then notifies the install routine of application program 36*d* of the location of the space, and the install routine proceeds to install application program 36*d* on hard drive 27.

Application manager 39 may manage the space on a single memory device, such as hard disk drive 27. Alternatively, application manager 39 may manage space on several memory devices, such as a group of several hard disk drives. If application manager 39 manages several devices, it provides space to a requesting install routine on one or more of the devices, based on various criteria. For example, application manager 39 may provide space on the first device on which it is able to locate space; or, each application may provide its type (e.g., game, office suite, etc.) to application manager 39, which then assigns space based on the type of the application to be installed (e.g., all game applications could be installed on the first disk drive). In the present example and those which follow, application manager 39 manages space only on a single device, hard disk drive 27.

Figure 5:
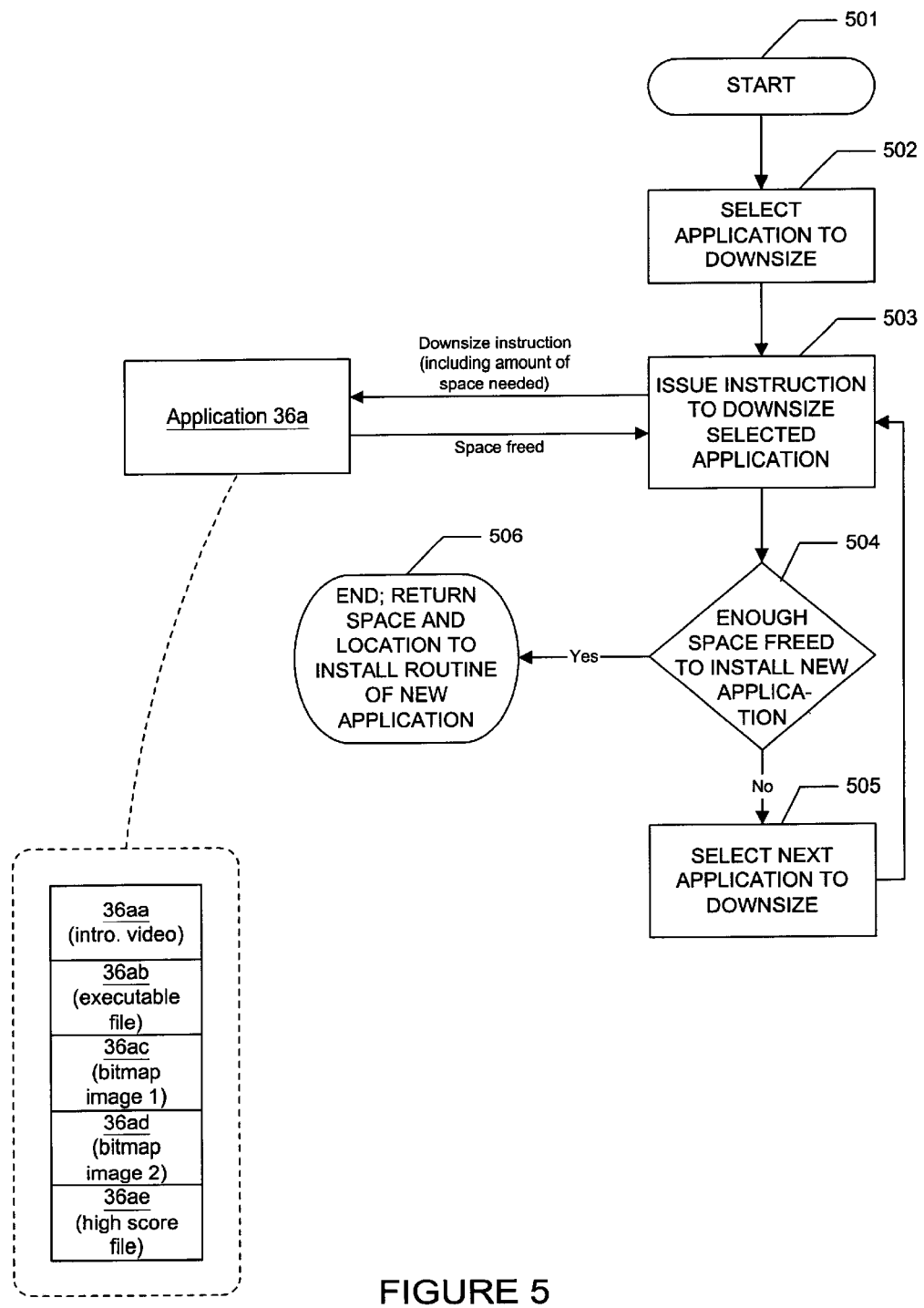
FIG. 5 is a flowchart showing the steps taken by an application manager to process a request for space in accordance with aspects of the invention.

FIG. 5 is a flowchart showing the steps by which application manager 39 processes a request for more space. Application manager 39 begins the process of obtaining space to install an application, such as application 36*d*, in response to the request of the application's install routine. The process of obtaining space begins at step 501. At step 502, application manager 39 selects a data object to downsize, such as application 36*a*. The data object to downsize may be selected based on a variety of factors, such as a historical record of the number of times that the data object has been downsized or restored. Application manager 39 could also take into account the amount of time that it will take to install an application. The amount of time may be supplied with the data object, or it may be estimated by application manager 39 based on the amount of data to be retrieved and the relevant data transfer rate (e.g., the number of bytes per second that can be retrieved from the data source, such as a CD-ROM drive or a T1 connection to the Internet).

After selecting a data object to downsize, such as application program 36*a*, application manager 39 issues an instruction to downsize the selected data object at step 503, preferably informing the downsize routine for application 36*a* of the amount of space that application manager 39 needs. The downsize routine associated with application 36*a* returns to application manager 39 the amount of space that it has freed. At step 504, application manager 39 determines whether it has freed sufficient space to satisfy the request for space. If it has not freed sufficient space, then it again selects a data object to be downsized at step 505, and returns to step 503 to issue a downsize instruction to that data object. Once sufficient space has been freed, application manager 39 terminates the processing of a request for space at step 506, and provides the amount and location of available space to the routine that requested the space.

When application manager 39 selects the next data object to be downsized at step 505, it may select a data object that has never been downsized, or it may select a previously downsized data object. The potential for obtaining additional space from a downsized application is due to the possibility that a downsized application may have been only partially downsized the last time its downsize routine was invoked. For example, application manager 39 may have previously installed a small application and, in the process of doing so, asked the downsize routine for application 36*a* to provide only a small amount of space, which did not require the downsize routine to remove all of the data that it could have removed. By way of illustration, in FIG. 5 application 36*a* comprises portions 36*aa*, 36*ab*, 36*ac*, 36*ad*, and 36*ae*. Portion 36*aa*, is expendable data, such as a 2 megabyte introductory video. Portion 36*ab* is a 1.5 megabyte executable file that can be recovered from CD-ROM. Portions 36*ac* and 36*ad* are each 2 megabytes in size and comprise recoverable data, such as bitmap images of which copies resides on a CD-ROM. Portion 36*ae* includes 1 megabyte of non-removable data, such as a user high-score file. A request to downsize application 36*a* (e.g., generated by an attempt to install a new application) might indicate that only 3 megabytes of space were needed, so the downsize routine removes only portions 36*aa* and 36*ab*. A second request (e.g., generated as a result of an attempt to install a second new application) might call for an additional 2 megabytes of space, so the downsize routine removes portion 36*ac*. A third request might call for 10 megabytes of space. In this case, the downsize routine can do no more than remove portion 36*ad*, which frees an additional 2 megabytes of space. Portion 36*ae* contains non-recoverable high scores, so the downsize routine will not remove it; the downsize routine simply informs application manager 39 that it has freed 2 megabytes of space, so application manager 39 must choose another data object to downsize. Any further call to the downsize routine for application 36*a* will result in a notification to application manager 39 that no additional space can be freed (unless application 36a has undergone a "restore" operation since the last call to its downsize routine, as discussed below).

After a data object has been downsized, a user may attempt to use the data object again. A data object may provide a restore routine, which replaces some or all of the data that was removed by a downsize routine. It is not necessary for a data object to provide a restore routine, as a downsize routine could be limited to removing expendable data. However, a data object that provides a restore routine may have a more effective downsize routine, as the downsize routine would be able to delete recreateable data in addition to expendable data, because the recreateable data could be replaced by the restore routine after it has been removed.

Figure 6:
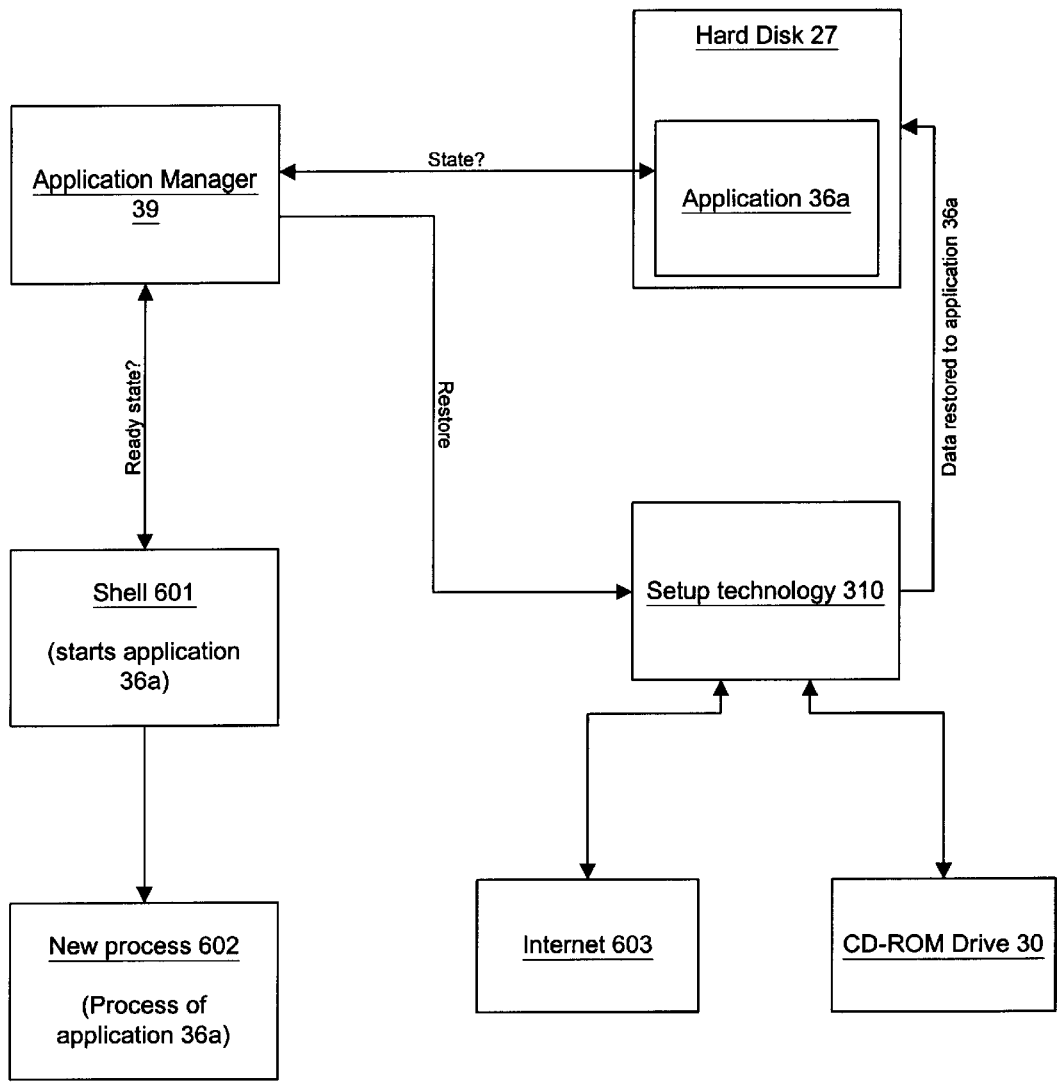
FIG. 6 is a block diagram showing the use of a restore operation by an application manager, in accordance with aspects of the invention.

FIG. 6 shows the use of a restore routine by an example system embodying the invention, such as application manager 39. In the example, the data object to be restored is application program 36a, whose data is called for as a result of attempting to start application program 36a. Shell 601 receives an instruction to start application program 36a. The instruction may come from a user, or it may come from a component of the computer system 20, such as operating system 35. Prior to creating a process for application 36a, shell 601 checks with application manager 39 to determine whether application 36a is in its "ready" state—i.e., a state in which the application program is ready to begin execution. Each data object being managed defines its own ready state and reports its current state to application manager 39. For example, application 36a could define its ready state as the state in which the application would exist immediately following installation. A data object, such as an application, may have several ready states, as it may not be necessary for the entire data object to reside on the medium in order for the data object to be ready to use. For example, application 36a may be in its ready state even if introductory videos are not present on hard disk 27; or, application 36a may have a smaller-size ready state, in which low-resolution bitmap images for use with the application are stored instead of memory-intensive high-resolution images.

Upon being queried as to whether application 36a is in its ready state, application manager 39 retrieves this information, which may be stored in a location associated with application manager 39, such as a registry, or may be stored on hard disk 27 as part of application 36a in a location accessible to application manager 39. If application manager 39 determines that application 36a is in its ready state, it notifies shell 601 of this fact, and shell 601, in turn, creates a process 602 to run application 36a.

If application 36a is not in its ready state, application manager 39 instructs the setup technology 310 associated with application 36a to restore application 36a to its ready state on its resident memory device, such as hard disk 27. Setup technology 310 uses restore routine 314 to retrieve the necessary data from its source, such as optical disk 30, or the Internet 603. If necessary, the user is prompted to insert a removable medium such as CD-ROM 31 into a disk drive, such as optical drive 30. Setup technology 310 replaces the retrieved data to hard disk 27. Setup technology 310 may replace all removed data, or it may replace only the data necessary for application 36a to run. For example, data previously removed by downsize routine 313 may include expendable data 302b, such as an introductory video, which might not be replaced by the restore routine. After replacing data to hard disk 27, setup technology 310 informs application manager 39 that application 36a is in its ready state.

Application manager 39, in turn, notifies shell 601, which creates a process 602 to run application 36a.

Figure 7:
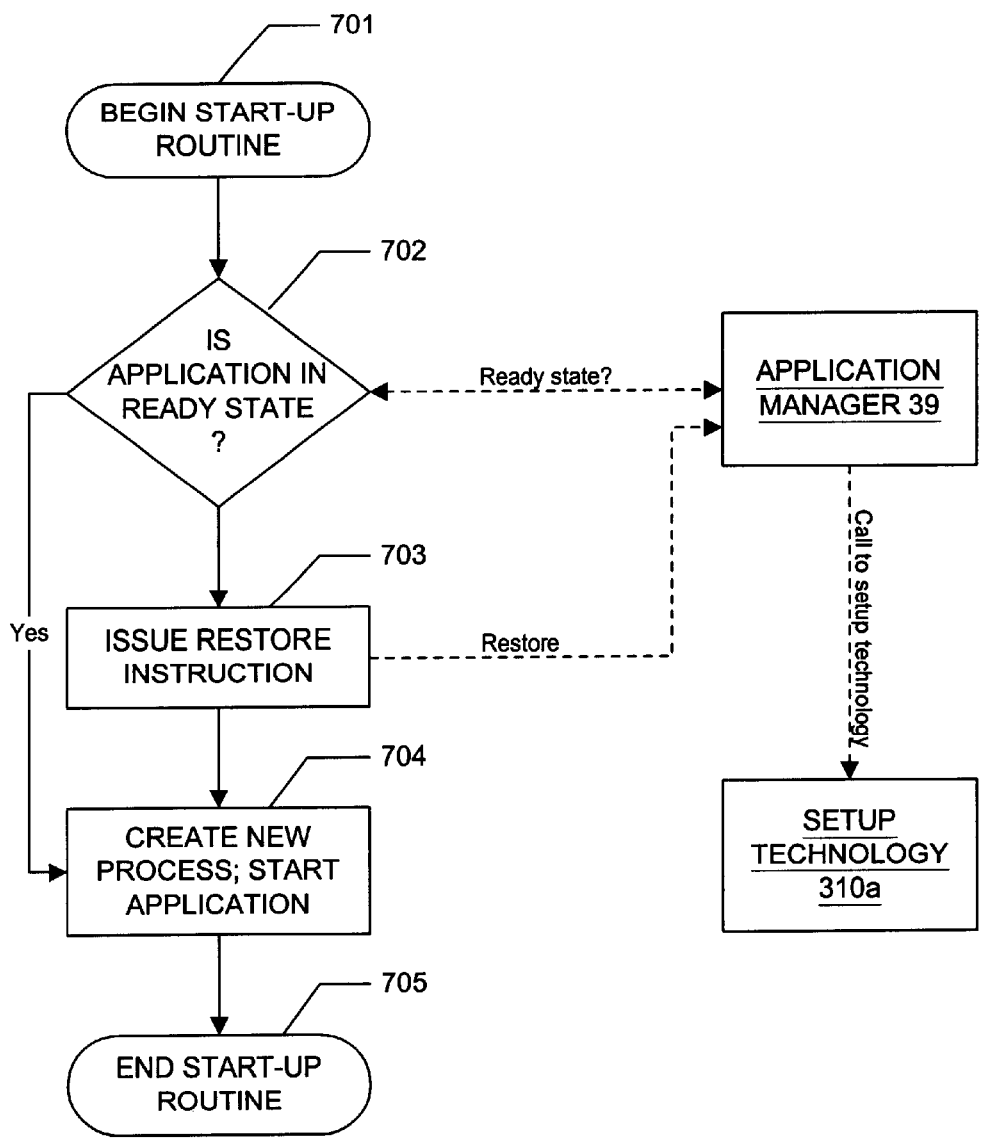
FIG. 7 is a flowchart showing the steps used to start an application residing on a memory that has been managed in accordance with aspects of the invention.

FIG. 7 is a flowchart showing the process by which an application is started when an application manager in accordance with the present invention is used. The start-up routine beings at step 701 in response to a request to start the application, such as a request from a user. Because application manager 39 may have removed some application data though downsizing, it is necessary to check each time an application is run whether the application is in its ready state (i.e., whether the data necessary to run the application is resident on the hard disk). At step 702, the start-up routine determines whether the application is in its ready state by querying the application manager. If the application is in its ready state, then the start-up routine proceeds to step 704 to create a process to run the application. If the application is not in its ready state, then application manager 39 is called upon to restore the application to its ready state. Application manager 39, in turn, calls the setup technology 310a for the application program being started, which replaces data to hard disk 27 in the manner depicted in FIG. 6. The start-up routine then proceeds to step 704 to create a process to run the application program. After the process has been created, the start-up routine terminates, and the application runs on the process created at step 704.

It is noted that the foregoing examples have been provided merely for the purpose of explanation and are in no way to be construed as limiting of the present invention. Particularly, while the invention has been described with reference to an application manager managing space on a hard disk in response to requests to run or install applications, it will be appreciated by those skilled in the art that the invention can be applied to various types of computer memory occupied by various types of data objects. For example, the invention could be used to manage files in a database, or data residing in volatile memory. Furthermore, the act of freeing up space in memory need not be performed in response to requests for space, but may arise in numerous contexts, such as where a computer system uses idle time to clear its memory resources. Likewise, the restoration of data to the managed medium need not be performed in response to a specific request for a data object, such as an attempt to run an application, but could arise in numerous contexts, such as where a system uses its idle time to keep a particular memory resource filled, or where the system employs a scheme to predict which downsized data objects will be called for in the future.

While the invention has been described with reference to preferred embodiments, it is understood that the words which have been used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

EXAMPLE APPLICATION MANAGER ARCHITECTURE

The following is an exemplary architecture for an application manager in accordance with the invention, which manages data objects comprising application programs.

The exemplary application manager manages computer hard disk space by removing portions of applications from the hard disk when space is needed, and by reinstalling the removed portions when a partially removed application is called for by the system. The application manager interfaces with a setup technology provided by each application; the setup technology for a given application performs the actual removal and replacement of data associated with the application. When a user wants to install an application, the user invokes the setup technology for the application, which notifies the application manager that it needs space on the disk, if necessary by using the setup technologies of previously installed applications to remove data associated with installed applications from the hard disk. When a user tries to run an application for which data has been partially removed from the disk, the application manager uses the application's setup technology to replace the data.

IApplicationEntry Object

Each application installed is associated with a unique instance of an "IapplicationEntry" object. The IApplicationEntry object is an interface into the application manager's record of an application instance. Upon installation of an application, the setup technology for the application calls CreateApplicationEntry(IApplicationEntry**), which creates a unique instance of an IApplicationEntry object. The interface provided by the IApplicationEntry instance must be used for the setup technology to apply actions to an application (i.e., install, reinstall, downsize, and uninstall). The entries in each IApplicationEntry include:

SetProperty( )
GetProperty( )
InitializeInstall( )
FinalizeInstall( )
InitializeDownsize( )
FinalizeDownsize( )
FinalizeReInstall( )
InitializeUnInstall( )
FinalizeUnInstall( )
Abort( )

The entries in the IApplicationEntry interface are functions (e.g., InitializeInstall( ), Finalizeinstall( ), etc.), which are member methods of an IApplicationEntry instance. Whenever a setup program wishes to act on an application, it must create a properly initialized IApplicationEntry in order to do so.

In general, the IApplicationEntry interface employs a "notify-then-commit" architecture: A setup technology first declares its intent to perform an operation (e.g., to install an application) by calling an "Initialize" method; after performing the operation, the setup technology reports to the application manager that the operation was performed by calling a "Finalize" method. The notify-then-commit architecture allows the application manager to detect operations that were declared but never completed.

The methods in each instance of IApplicationEntry are described below:

SetProperty(DWORD dwProperty, LPVOID pData, DWORD dwDataLen)

The SetProperty( ) method is used to set various properties of an application instance. A list of properties in an application instance is provided below in the Properties section. The setup program is required to SetProperty( ) on certain properties prior to calling the Initialize . . . ( ) and Finalize . . . ( ) methods. For example, a setup program calls set property to set APP_PROPERTY_STATE prior to calling FinalizeDownsize( ).

GetProperty(DWORD dwProperty, LPVOID pData, DWORD dwPropertyLen)

The GetProperty( ) method is counterpart of SetProperty( ) and is used to retrieve application properties stored within an IApplicationEntry instance. Setup programs use this method in order to retrieve setup information about an application. For example, following a call to the InitializeInstall( ) method, the setup program calls GetProperty( ) to retrieve the root path, the setup root path and the GUID assigned to the application being installed.

InitializeInstall(void)/FinalizeInstall(void)

The InitializeInstall( ) method is called by the setup technology to notify the application manager that the setup program is about to start the installation process. In order to be successful the setup programs will be required to calls SetProperty( ) to set the APP_PROPERTY_ESTIMATED_INSTALL_SIZE property prior to calling InitializeInstall( ). APP_PROPERTY_ESTIMATED_INSTALL_SIZE represents the amount of disk space needed to install the resources that do not already exist on the local machines, and does not include resources that already exist, such as files that may have been installed after an aborted, but partially performed, installation.

Once InitializeInstall( ) successfully returns, the setup program should immediately call GetProperty( ) to retrieve the values of the following properties:

APP_PROPERTY_GUID
APP_PROPERTY_ROOTPATH
APP_PROPERTY_SETUPROOTPATH.

After performing an installation, the setup program calls FinalizeInstall( ) to notify the application manager that the installation is complete. Prior to calling FinalizeInstall( ), the setup program sets the following properties:

APP_PROPERTY_REMOVABLE_SIZE
APP_PROPERTY_NON_REMOVABLE_SIZE
APP_PROPERTY_DOWNSIZE_CMDLINE
APP_PROPERTY_REINSTALL_CMDLINE
APP_PROPERTY_UNINSTALL_CMDLINE

InitializeDownsize(void)/FinalizeDownsize(void)

The InitializeDownsize( ) method is called to notify the application manager that an application is about to start the downsize operation. The APP_PROPERTY_GUID must be set within the IApplicationEntry instance prior to calling InitializeDownsize( ). Calling InitializeDownsize( ) causes the application manager to change the state of the application to APP_STATE_DOWNSIZING.

The FinalizeDownsize( ) method is called once the setup program has finished downsizing an application. The setup program will be required to SetProperty( ) on the property APP_PROPERTY_REMOVABLE_SIZE prior to calling FinalizeDownsize( ).

Initialize UnInstall(void)/Finalize UnInstall(void)

The InitializeUnInstall( ) method is called by the setup program in order to notify the application manager that it is about to uninstall an application.

The FinalizeUnInstall( ) method is called by the setup program to notify the application manager that the uninstallation process has been completed.

Abort(void)

This method is used when a setup program wishes to end an action without finalizing it. Aborting any actions (i.e., InitializeInstall, InitializeReInstall, etc.) causes the application manager to revert the application state back to what it was before the action started. In the case of Initialize Install( ), calling abort will cause the application manager to delete its record of the application.

Setup Technologies

The application manager relies on setup technologies for all actions that modify the state of an application. Therefore, whenever an application registers with the application manager, it must also register the underlying setup technology responsible for managing it.

Setup technologies are invoked by running a command line. The command line is in a format appropriate for the operating system running on the computer whose resources the application manager controls, such as the WINDOWS operating system.

The setup technology informs the application manager of the command line to perform the downsize, reinstall, and uninstall operations by calling SetProperty( ) to set the following properties:

APP_PROPERTY_DOWNSIZE_CMDLINE
APP_PROPERTY_REINSTALL_CMDLINE
APP_PROPERTY_UNINSTALL_CMDLINE

Each command line specification is separate in order to allow the flexibility of using multiple executables based on the action needed. However, the setup technology may be contained within one executable, with each defined command line containing parameters that specify which action the setup technology is to perform.

The application manager adds the following parameters to any command line specified in the properties listed above:

/guid=<{. . . }>/action=<string>/size=<size> where:
GUID=the GUID assigned to the action by CreateApplicationEntry( )
action=DOWNSIZE, REINSTALL, or UNINSTALL
size=disk space needed when downsize is called
The/size parameter is only used when /action=DOWNSIZE.
Properties The following is a description of the properties used in an instance of IApplicationEntry:

APP_PROPERTY_GUID

This GUID is a unique identifier assigned by the application manager when InitializeInstall is called. The setup program should save this value since it is needed property in action calls (Initialize . . . ( )/Finalize . . . ( ) as well as AddAssociation( )/RemoveAssociation( ) and Run( )).

APP_PROPERTY_ROOT_PATH

The root path value is set by calling the InitializeInstall( ) method. It indicates where a setup program should store application files.

APP_PROPERTY_SETUP_ROOT_PATH

The setup root path value is set by calling the InitializeInstall( ) method. It indicates where a setup program should store setup program files (i.e. Setup.exe, Setup.dll, etc.).

APP_PROPERTY ESTIMATED_INSTALL_SIZE

The estimated install size represents the amount of additional disk space that a setup program will need in order to successfully install/reinstall an application. This value should be specified in Kb. This value represents additional disk, rather than total disk space, needed by the install or reinstall routine, which is significant in the case where a setup program was aborted after a partial installation. For example, if a setup program requests 300 Mb of disk space and then fails after installing 120 Mb, it should ask for 180 Mb of disk space when attempt the installation a second time. This property can only be set prior a call to InitializeInstall( ) or prior to calling InitializeReInstall( ).

APP_PROPERTY_REMOVABLE_SIZE

The removable size represents the amount of disk space (in Kb) that the removable resources of application take up on disk. This property can only be set prior a calling to FinalizeInstall( ) or prior to calling FinalizeReInstall( ).

APP_PROPERTY_NON_REMOVABLE_SIZE

The non-removable size represents the amount of disk space (in Kb) that the non-removable resources of application take up on disk. Non-removable resources are resources that cannot be recreated by the setup program once they are deleted from the local machine (e.g., saved game files, configuration files and other user-generated documents).

This property can only be set prior a calling to FinalizeInstall( ) or prior to calling FinalizeReInstall( ).

APP_PROPERTY_DOWNSIZE_CMDLINE

The downsize command line value represents the command line that the application manager needs to call in order to ask an application to downsize itself. This property can only be set prior to calling FinalizeInstall( ) or FinalizeReInstall( ).

APP_PROPERTY_REINSTALL_CMDLINE

The reinstall command line value represents the command line that the application manager needs to call in order to ask an application to reinstall itself. This property can only be set prior to calling FinalizeInstall( ) or FinalizeReInstall( ).

APP_PROPERTY_UNINSTALL_CMDLINE

The uninstall command line value represents the command line that the application manager needs to call in order to ask an application to uninstall itself. This property can only be set prior to calling FinalizeInstall( ) or FinalizeReInstall( ).

APP_PROPERTY$_{EXECUTE}$_CMDLINE

The execute command line property represents the command line that the application manager needs to call in order run the application. This property can only be set prior to calling FinalizeInstall( ) or FinalizeReInstall( ).

APP_PROPERTY_STATE

This property is mainly used by setup programs in order to define what state an application is in. This helps setup programs find out about error states (i.e., failed installation, failed reinstallation, etc.). Allowable values of this property include APP_STATE_READY, APP_STATE_DOWNSIZED, and APP_STATE_DOWNSIZING. However, this property can be set subsequent to calling FinalizeDownsize( ) if a setup program wishes to advice the application manager that the application is still runable. By default, calling FinalizeDownsize( ) will cause the application manager to assign an APP_STATE_DOWNSIZED state to an application. However, if an application was downsized by reducing its application size down to a smaller installation (i.e., from large to medium), then the application would still be in an APP_STATE_READY. Setup program can call SetProperty on APP_PROPERTY_STATE with APP_STATE_READY in order to advise the application manager not to flag the application as downsized. This property can only be set prior to calling FinalizeDownsize( ), and should only be set if the downsize application is still runable (i.e., the application downsized itself down to a smaller install size).

We claim:

1. A method for managing memory, comprising the acts of:

selecting, according to a first function, a data object having a first memory size; and requesting that said data object select and remove portions of its data thereby downsizing said data object from said first memory size to a second memory size by deleting a portion of said data object from the memory, said second memory size being non-zero, said requesting act being performed without identifying the portions of data that said data object is to select and remove.

2. The method of claim 1, wherein said data object comprises application code and data.

3. The method of claim 1, wherein said first function comprises a least-recently-used function.

4. The method of claim 1, further comprising the act of increasing the size of the downsized data object by reconstructing at least some of the deleted portion of said data object from a secondary source.

5. The method of claim 4, wherein said secondary source comprises a network server.

6. The method of claim 4, wherein said secondary source comprises a CD-ROM.

7. The method of claim 4, wherein said first function considers the number of times a data object has previously been reconstructed.

8. The method of claim 1, further comprising the acts of:
    selecting, according to a second function, a second data object having a third memory size; and
    downsizing said second data object to a fourth memory size by deleting a portion of said second data object, said fourth memory size being non-zero.

9. The method of claim 1, further comprising the act of downsizing said data object from said second memory size to a third memory size by deleting a second portion of said data object.

10. The method of claim 1, further comprising the act of receiving a request for memory space, wherein said downsizing act is performed in response to said request.

11. The method of claim 1, wherein said memory consists of one memory device.

12. The method of claim 1, wherein said memory comprises a disk storage device.

13. A computer-readable medium containing computer-executable instructions to perform the method of claim 1.

14. The method of claim 1, further comprising:
    prior to said downsizing act, using said data object whereby at least some non-recreateable data is added to said data object;
wherein said downsizing act comprises deleting a portion of said data object without deleting said non-recreateable data.

15. The method of claim 1, further comprising:
    installing said data object in the memory from a source, said data object including at least some expendable data;
wherein said downsizing act comprises deleting said expendable data, and wherein said method further comprises:
    subsequent to said downsizing act, reconstructing at least some of said data object from said source without reconstructing said expendable data.

16. A system for managing memory, comprising:
    a data manager having a first interface for receiving requests for memory space and a second interface for communicating instructions; and
    a plurality of data objects being linked to said data manager, whereby said data manager communicates instructions to said data objects by way of said second interface, and wherein said instructions comprise an instruction to select for removal and remove a portion of at least one of said data objects from said memory, said portion being less than all of said one of said data objects, said instruction not identifying the portion to be removed from said at least one of said data objects.

17. The system of claim 16, wherein each of said data objects comprises application code and data.

18. The system of claim 16 wherein said memory consists of one storage device.

19. The system of claim 16, wherein said memory comprises a disk storage device.

20. The system of claim 16, wherein said instructions further comprise an instruction to replace in said memory at least some data which was previously removed from said memory.

21. The system of claim 16, wherein said instruction to remove a portion of at least one of said data objects comprises an indication of the amount of memory to be freed.

22. A method of managing memory comprising the acts of:
    determining, according to a first function, to increase the free space available in said memory;
    selecting, according to a second function, a data object having a first memory size; and
    issuing a first instruction to downsize said data object, wherein said instruction is issued to a setup technology, and wherein said data object responds to said first instruction by identifying for removal and removing a portion of a said data object from said memory thereby reducing the size of said data object from said first memory size to a second memory size, said second memory size being non-zero, wherein the downsizing of said data object removes it from a state of being ready for use, and wherein said first instruction does not identify the portion to be removed from said data object.

23. The method of claim 22, wherein said data object comprises application code and data.

24. The method of claim 22, wherein said setup technology is provided by said data object.

25. The method of claim 22, wherein said first function comprises receiving a request for space in said memory.

26. The method of claim 25, wherein said request for space indicates the quantity of space requested, and wherein said issuing act comprises communicating said quantity to said setup technology.

27. The method of claim 22, further comprising the acts of:
    determining, according to a third function, to return said data object to said state of being ready for use;
    issuing a second instruction to said setup technology to restore said data object to said state, and wherein the restoration of said data object restores said data object to said state.

28. The method of claim 27, wherein the act of restoration of said data object to said state replaces to said data object data that was previously removed by the downsizing of said data object.

29. The method of claim 27, wherein said third function comprises receiving a request to access said data object.

30. The method of claim 22, further comprising the act of issuing a second instruction to downsize said data object, wherein said second instruction reduces the size of said data object from said second memory size to a third memory size, said third memory size being non-zero.

31. The method of claim 22, further comprising the acts of:
    selecting, according to a third function, a second data object having a third memory size; and issuing a second instruction to downsize said second data object, wherein said second instruction is issued to a second setup technology, and wherein the downsizing of said second data object reduces the size of said second data object from said third memory size to a fourth memory size, said fourth memory size being non-zero.

32. A computer-readable medium containing computer-executable instructions to perform the method of claim 22.

33. The method of claim 22, further comprising the acts of:

writing said setup technology to the memory, said setup technology comprising:
  a first callable function that causes said data object to be installed in said memory;
  a second callable function that cause-said data object to be uninstalled from said memory;
  a third callable function that causes said data object to be downsized in said memory; and
  a fourth callable function that causes said data object to be restored in said memory subsequent to an act of downsizing said data object; and installing said data object in said memory by calling said first callable function;

wherein said act of issuing a first instruction to downsize said data object comprises calling said third callable function.

34. The method of claim 22, wherein said setup technology reduces the size of said data object by selecting portions of said data object to delete and by deleting the selected portions of said data object from the memory, wherein said first instruction is issued by an entity, and wherein said setup technology selects the portions of said data object to delete without the selected portions being identified by said entity.

* * * * *